May 27, 1930.  J. D. SPALDING ET AL  1,760,180
DIFFERENTIAL AND STRAIGHT BRAKE EQUALIZER FOR ROTARY DRAW WORKS
Filed July 12, 1926   3 Sheets-Sheet 1

Inventors
John D. Spalding
David S. Faulkner
By Lyon & Lyon
Attorneys

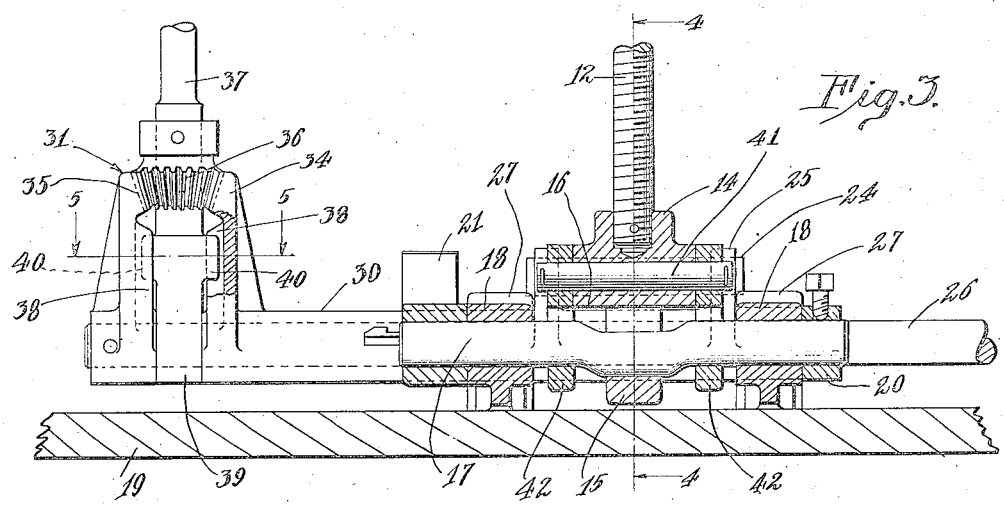
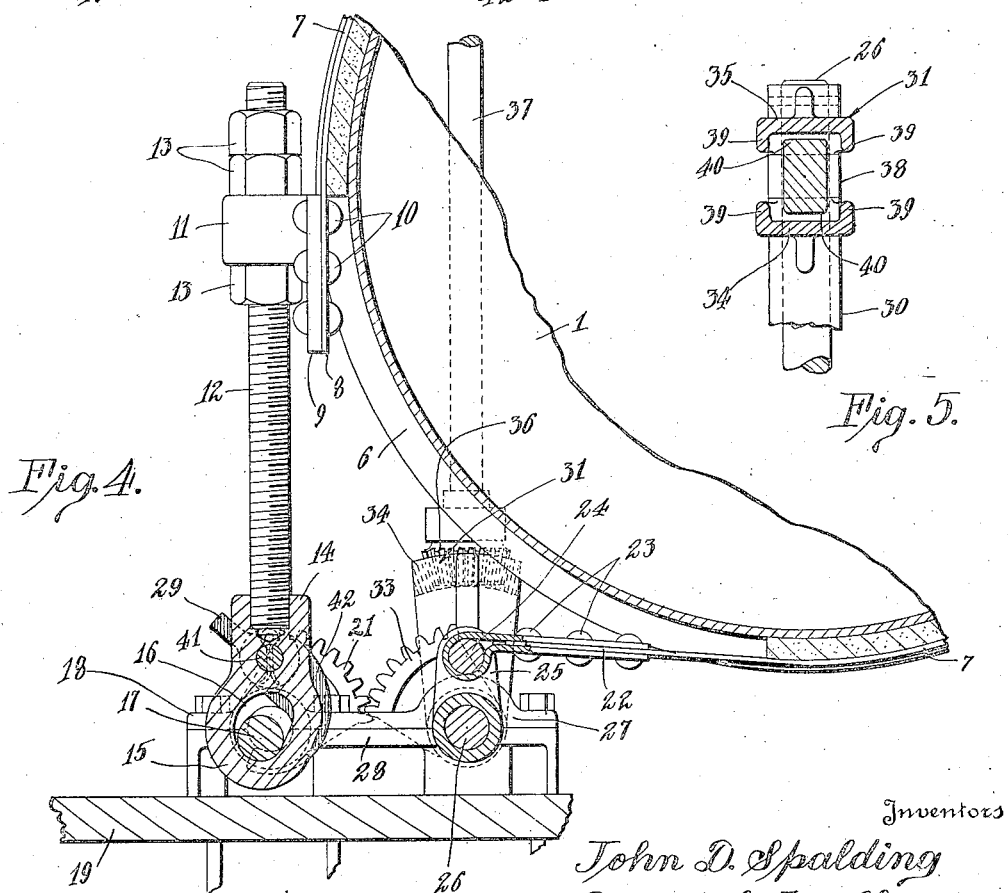

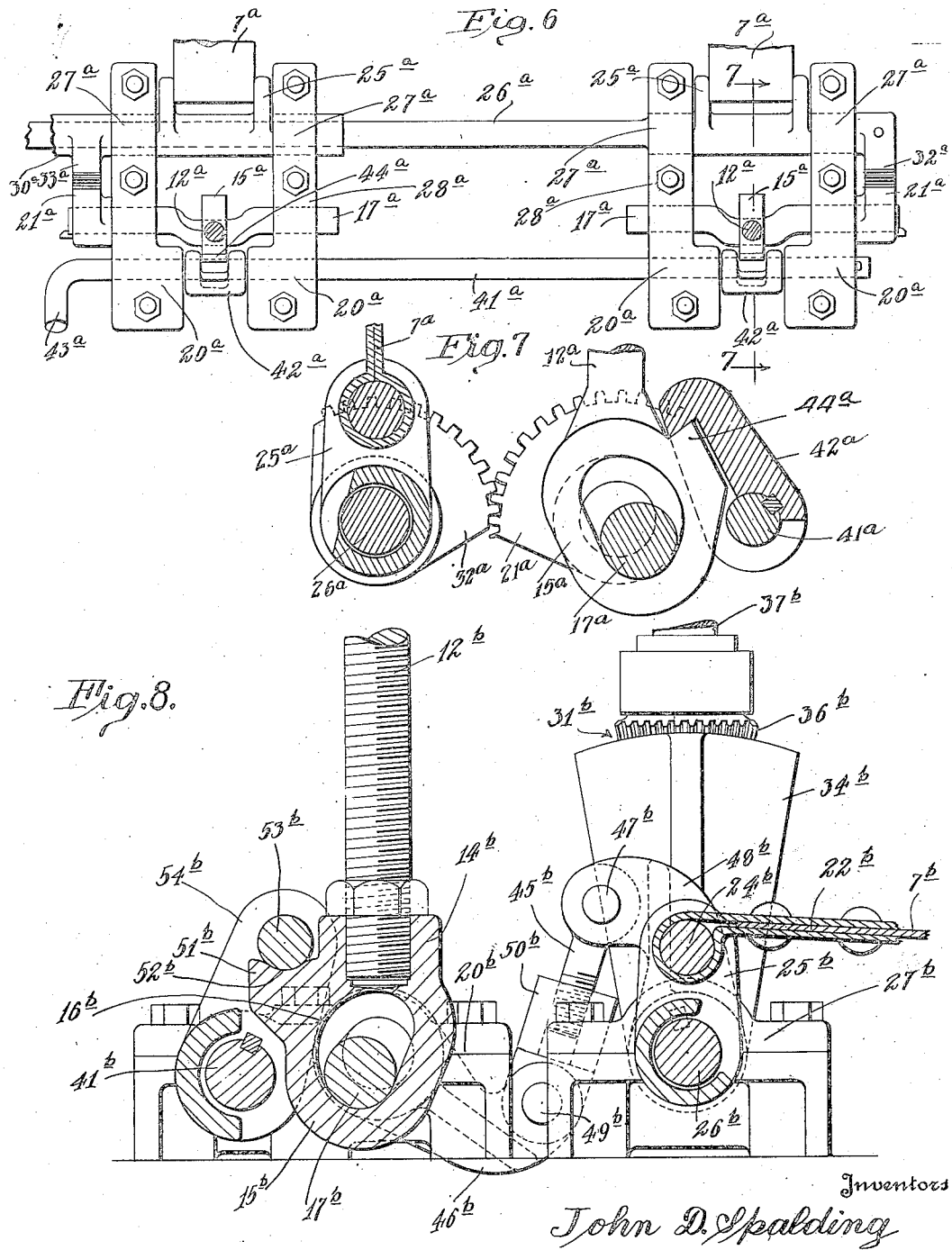

Patented May 27, 1930

1,760,180

UNITED STATES PATENT OFFICE

JOHN D. SPALDING, OF CRAFTON, PENNSYLVANIA, AND DAVID S. FAULKNER, OF LOS ANGELES, CALIFORNIA, ASSIGNORS TO THE NATIONAL SUPPLY COMPANY OF DELAWARE, OF NEW YORK, N. Y., A CORPORATION OF DELAWARE

DIFFERENTIAL AND STRAIGHT BRAKE EQUALIZER FOR ROTARY DRAW WORKS

Application filed July 12, 1926. Serial No. 121,811.

This invention relates to differential and straight brake equalizers for rotary draw works, and more particularly to an equalizing mechanism adapted for use in connection with the line drum of a rotary draw works and to a provision of means for providing both a straight brake mechanism and a differential brake mechanism for actuating the brake bands of rotary draw works, and which brake actuating mechanisms are provided with equalizing means for equalizing the braking force imparted to the respective bands when the mechanism is employed either as a straight brake or as a differential brake.

During the drilling of a well, it is particularly advantageous to have both straight and differential braking means for the hoisting and lowering of the drill stem into and from the well hole during the drilling process. In order to equalize the braking force imparted to the spaced brake bands provided in such a hoisting apparatus, it is desirable that means be provided which are actuated from a common point in the derrick for applying simultaneously the braking force to both of the spaced brake bands and for equalizing the force so applied so that the brakes will operate efficiently and be of long life and so that one band will not wear in excess of the other.

It is therefore an object of this invention to provide a differential and straight brake actuating mechanism for use in connection with the hoisting mechanism of a rotary draw works, and which differential and straight brake mechanism includes an equalizing means for equalizing the braking force or actuation which is imparted to both the dead and live ends of the brake bands.

Another object of this invention is to provide a differential and straight brake mechanism in which means are provided for rendering the differential brake actuating means inoperative when it is desired to employ only the straight brake actuating means.

Another object of this invention is to provide a differential and straight brake mechanism in which equalizing means are provided for both the dead and live ends of the brake bands, and which equalizing and actuating means are controlled from a common operating level.

Other objects and advantages of this invention will be apparent from the following detailed description of our invention as illustrated in the accompanying drawings, in which drawings:

Figure 3 is an enlarged fragmental front elevation mainly in vertical of the straight and differential brake equalizer embodying this invention.

Figure 4 is an end elevation thereof taken substantially on the line 4—4 of Figure 3.

Figure 5 is a top plan view illustrating the stop means provided in connection with the differential actuating means embodied in this invention and taken substantially on the line 5—5 of Figure 3.

Figure 6 is a plan view of a second modified form of differential and straight brake equalizer embodying this invention and illustrating a unitary means adapted to be connected with the differential braking means by a single lever positioned adjacent the brake actuating lever.

Figure 7 is a sectional end view taken on the line 7—7 of Figure 6.

Figure 8 is a sectional end elevation of a third modified form of a brake equalizing means embodied in this invention.

Figure 1:
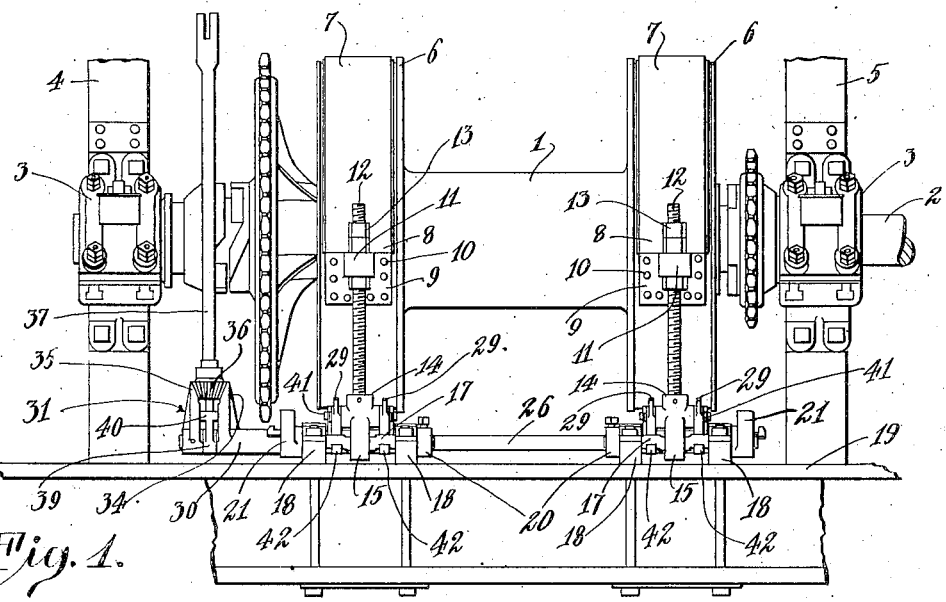
Figure 1 is a side elevation of a fragment of a rotary draw works illustrating the hoisting mechanism thereof and a differential and straight brake actuating means embodying this invention.

In the drawings, 1 illustrates a line drum of a rotary draw works, which drum is mounted upon the drum shaft 2 which is journaled in bearings 3 secured to the posts 4 and 5, respectively. The drum shaft 2 is driven from a line shaft (not shown) by any suitable manner which is well understood in the art. The drum 1 has at its opposite ends spaced brake rims 6, upon which a brake band 7 of any desired or preferred construction is mounted. The ends 8 of the brake band 7, hereinafter referred to as the dead ends, have plates 9 secured thereto by any suitable means, such as the rivets illustrated at 10. The plates 9 have formed integral therewith bosses 11 through which bolts 12 extend, and which bolts 12 are secured and adjusted in position by means of a plurality of nuts 13, all of which construction is well understood in the art.

The bolts 12 are at their lower end secured to T-coupling members 14, which coupling members 14 have formed at their lower end downwardly extending sections 15 which are cored out as illustarted at 16 and through which cored sections, rocker shafts 17 are extended. The rocker shafts 17 are journaled in bearings 18 which are rigidly secured to the floor 19 of the derrick in which the rotary draw works is positioned. Collars 20 are secured to the adjacent ends of the rocker shaft 17 in position to prevent endwise movement of the rocker shaft 17. Keyed at the opposite end of the rocker shaft 17 are gear segments 21, which gear segments 21 are mounted in position to likewise prevent endwise motion of the rocker shaft 17.

Means are provided for connecting the live ends 22 of the brake band 7 with means for actuating the same to tighten the said brake bands upon the rim 6. Any suitable means 23, secured to the end of the brake band 7, passes over the crank portion 24 of rocker arms 25. The rocker arm 25 for the right-hand brake band 8 is secured to a rod shaft 26 which is journaled in bearings 27 and are secured to the floor 19 of the derrick preferably in alignment with the bearings 18 by means of straps 28 so as to enable easy alignment of the dead and live ends 8 and 22 of the brake band 7. The shaft 26 extends through a sleeve shaft 30 upon which the rocker 25 of the left-hand band 7 is secured or which rocker member 25 may be formed integral with the sleeve shaft 30 to an equalizing and actuating mechanism 31, the construction of which will hereinafter be described.

Secured to the rod shaft 26 is a gear segment 32 which is adapted to mesh with one of the gear segments 21 and secured to the sleeve shaft 30 is a gear segment 33 which is in position and adapted to mesh with the opposite gear segment 21.

Formed integral with the sleeve shaft 30 and extending upward therefrom is a gear segment 34 and secured to the gear shaft 26 is a gear segment 35, the gear segments 34 and 35 being mounted in position to mesh with a pinion 36 which is secured to an operating shaft 37, and which operating shaft has at its lower end extension a boss 38 which is journaled upon the rod shaft 26. The gear segments 34 and 35 have formed at their edges, webs 39 which are adapted to engage the outwardly extending stops 40 formed in the lower extension of the operating shaft 37 to prevent the passing of the gear segments 34 from off the pinion 36.

Means are provided for connecting the dead ends 8 of the brake bands 7 with the actuating and equalizing mechanism 31 and for rigidly connecting the dead ends 8 of the brake bands so that the same will not be actuated when the equalizing and actuating mechanism 31 is actuated, which means preferably comprise the bolt 12, as heretofore specifically described, which is connected with the T-member 14 which has the lower extension 15 with the cored hole 16 formed therein in which the actuating shaft 17 is mounted. The cored hole 16 is considerably larger than the rocker portion of the rocker shaft 17 so that the rocker portion of the shaft 17 may rotate freely within the cored hole 16 without the necessity of actuating the dead ends 8 of the brake band 7.

Means are provided for firmly securing the T-members 14 with the straight portions of the rocker shaft 17 when it is not desired to actuate the dead ends 8 of the brake bands, which means may be of any desired or preferred construction, one form of which is illustrated as comprising a pin 41 which passes through the T-member 14 and is provided at its opposite ends with hooks 42 which are adapted to rotate over the straight portion of the rocker shaft 17 so as to rigidly connect the bolt 12 with the rocker shaft 17 and prevent movement thereof as the rocker portion of the shaft 17 is rotated.

The operation of this straight and differential equalizer is as follows:

When employed as a differential brake, that is, with the hook members 42 released, the operator grips the handle 37 and pulls the same away from the drum shaft 2 so that the rod and sleeve shafts 26 and 30 are revolved. This rotation of the rod and sleeve shafts causes the crank members 24, which are secured to the respective shafts, to move to tighten the live ends 22 of the brake band 7 on the rims 6 of the drum 1. If the braking force applied is unequal on either of the bands 7, the shafts 26 and 30 will rotate relative to each other so as to equalize the braking force applied. At the same time that the live ends 29 are being actuated, the dead ends 8 are actuated through the respective pinions 32, 33 and 21 so as to release the engagement of the brake band at the dead end so as to impart a differential braking force to the brake band 7. If the movement of the dead ends 8 is not equal, the pinions, 21, 21, 32 and 33 will be rotated an unequal amount so as to rotate the shafts 26 and 30 relative to each other so as to equalize the differential braking actions applied to the dead ends of the brake band 7. It will therefore be obvious from the foregoing that we have provided means for equalizing the braking action of a differential braking mechanism as applied to the spaced brakebands which are employed in connection with the rotary draw works drum.

When the brakes are employed as a straight brake and the hooks 42 are secured to the straight portion of the crank shaft 17, the bolts 12 and hence the dead ends 8 of the brake bands will be prevented from moving or will be held rigidly so that as the operator moves the handle 37 in a direction away from the drum shaft 2, the crank members 24 will be rotated to pull only upon the live ends 29 of the brake drums and so that when there is a difference in braking force applied to either of the brake bands 7, the shafts 26 and 30 will rotate relative to each other at the gear segments 34 and 35 to equalize the braking force applied.

Kick-off lugs 29 are preferably formed integral with the hooks 42 to enable the operator to kick off the hooks 42 when it is desired to employ the brake actuating means above described as a differential and straight brake equalizer.

Figure 6 illustrates a modified form of differential and straight braking equalizing mechanism, which is entirely similar to that heretofore described, with the exception that the hooks $42^a$ are all secured to a common shaft $41^a$ which is journaled in bearings supported by the same brackets which supports the bearings $20^a$ and $27^a$ and which shaft $41^a$ extends longitudinally with the drum shaft 2 to a point of accessibility near the operating shaft, not shown, and is provided with a handle $43^a$ so as to permit the actuation simultaneously of all of the hooks $42^a$ by actuation of the handle $43^a$ and from a point near the operating shaft. The hooks $42^a$, instead of gripping the straight portions of the crank shaft $17^a$, grip the lower extensions of the members $15^a$ at a shoulder $44^a$ so as to hold the bolts $12^a$ from movement when it is desired to convert the differential braking mechanism to a straight brake equalizer.

Figure 2:
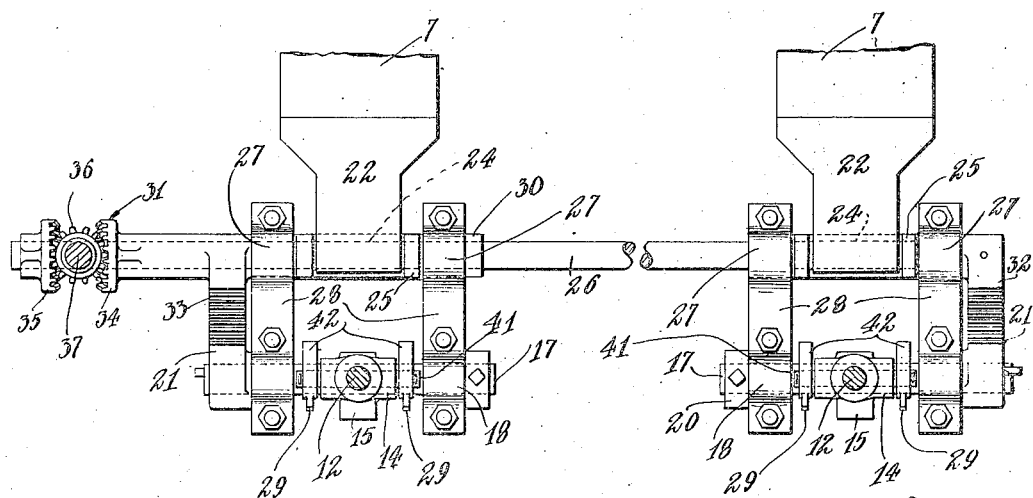
Figure 2 is a top plan view of a differential and straight brake mechanism embodying this invention and illustrating live ends of the brake bands as secured to the straight brake actuating means.

Figure 7 illustrates a third modified form of differential and straight brake equalizer which differs from the brake equalizers heretofore set forth in the provision of an adjustable link $45^b$ which is pivotally secured at a pin $45^b$ to a crank link $46^b$ which is rigidly secured to the crank shaft $17^b$ and which link $45^b$ is pivotally secured at a pin $47^b$ to a crank link member $48^b$ which is rigidly secured to the shaft $26^b$ as illustrated in Figure 7 or which may be rigidly secured to the sleeve shaft as is believed to be obvious from the foregoing. In order to permit adjustment of the link $45^b$ the same is preferably formed in two sections, an eye-bolt section, which is pivotally secured at the pin $47^b$ to the crank link $48^b$ of the section $50^b$ into which the eye-bolt section is screw-threaded and which section $50^b$ is pivotally secured at the pin $49^b$ to the crank link $46^b$. The member $15^b$ in this modification is provided with an outwardly extending boss $51^b$ which has an arcuate recess $52^b$ formed in its upper surface into which a pin $53^b$ may be inserted, and which pin $53^b$ is carried between a pair of links $54^b$ which are mounted upon a shaft $41^b$ which is journaled in the brackets which supports the bearings $20^b$ and $27^b$ and which shaft $41^b$ may extend longitudinally the length of the brake equalizing apparatus and be provided with a single actuating lever as in the modification of this invention illustrated in Figure 6 or the hook members provided by the links $54^b$ at pins $53^b$ may be mounted upon separate shafts as illustrated in the modification of this invention shown in Figure 2.

The modifications of our invention herein specifically set forth are illustrative of the forms which this invention may take and it is to be understood that our invention is not limited to any of the modifications herein shown but is for the scope of the appended claims.

We claim:

1. In a draw works brake, the combination of a pair of spaced brake rims, brake bands mounted on the said rims, actuating means secured to the live ends of said brake bands, differential actuating means secured to the dead ends of the said brake bands, means for equalizing the said brake actuating means, and means adapted to be connected with the dead end brake band actuating means for rendering the same inoperative.

2. In a draw-works brake equalizer, the combination of a pair of spaced brake rims, brake bands mounted on the said rims, means secured to the live ends of the said brake rims for actuating the same, differential actuating means secured to the dead ends of the brake bands, and means operable in connection with the dead end actuating means and adapted to be connected to the same for rendering the dead end actuating means inoperative.

3. In a draw works brake, the combination of a pair of spaced brake rims, brake bands mounted on the said rims, a pair of concentric shafts, the inner of which shafts extends beyond the end of the outer of said shafts, crank means secured to the inner of said shafts beyond the end of the outer of said shafts and adapted to be connected with the live end of one of said brake bands, crank actuating means secured to the dead end of the said brake band, means operably connecting the said live end crank actuaing means with the dead end actuating means, crank means secured to the outer shaft and adapted to be connected with the live end of the oposite of said brake bands, crank actuating means adapted to be secured to the dead end of the latter said brake band, means operably connecting the outer of said shafts with the latter said dead and actuating means, and means connected with each of said dead end actuating means for rendering the same inoperative when it is desired to employ the draw works brake actuating means as a straight brake equalizer.

4. In a draw works brake, the combination of a pair of spaced brake rims, brake bands mounted on the said rims, a pair of concentric shafts, means secured to the outer of said shafts and to the dead and live ends of one of said brake bands, means secured to the inner of said shafts and to the dead and live ends of the other of said brake bands, a gear segment secured to each of the said shafts in position to mesh with a pinion carried by a common actuating lever for actuating the dead and live ends of each of said brake bands, and complementary stop means secured to each of the said gear segments and the said common actuating lever.

5. In a draw works brake, the combination of a pair of spaced brake rims, brake bands mounted on the said rims, actuating means secured to the live ends of the said brake bands, actuating means secured to the dead ends of said brake bands, means operably connecting the said actuating means with a common actuating lever, and means adapted to be connected with the dead end actuating means for rendering the same inoperative when it is desired to employ the draw works brake as a straight brake.

6. In a drawworks brake equalizer, the combination of a pair of spaced brake rims, brake bands mounted on the brake rims, actuating means secured to the live ends of the brake bands, actuating means secured to the dead ends of the brake bands, the said actuating means for the live and dead ends of the brake bands being operable to tighten the brake bands at one end and loosen the same to a lesser degree at their other ends, equalizing means, means connecting the equalizing means with the live and dead ends, brake band actuating means, and means adapted to be operably connected with one of said brake band actuating means for rendering the same inoperative.

7. In a drawworks brake equalizer, the combination of a pair of spaced connected brake bands, a shaft, a sleeve shaft surrounding the shaft, crank means connecting the shaft with the live end of one of said brake bands, crank means operably connecting the shaft with the dead end of the said brake bands, the latter said crank means being operable in a direction reverse from that of the first said crank means, crank means connecting the live end of the second brake band with the said sleeve shaft, and crank means operably connecting the dead end of the second brake band with the said sleeve shaft, the crank means to the dead end of the second brake band being operable in a reverse direction from that of the crank means to the live end of the second said brake band, and equalizing and actuating means connecting the said shaft and sleeve shaft.

8. In a drawworks brake, the combination of a pair of spaced connected brake rims, brake bands mounted on the rims, differentially operably actuating means secured to the live ends and the dead ends of the brake bands for actuating the brake bands to tighten the same at the live ends and loosen the same to a lesser degree at the dead ends, means operably connecting the said differential actuating means with a single actuating lever, and means operably connected with the dead ends of the brake bands and operable to hold the dead ends from actuation.

Signed at Carnegie, Penn., this 1st day of June, 1926.

Signed at Torrance, Calif., this 19th day of May, 1926.

JOHN D. SPALDING.
DAVID S. FAULKNER.